United States Patent
Papple et al.

(10) Patent No.: US 9,625,152 B2
(45) Date of Patent: Apr. 18, 2017

(54) COMBUSTOR HEAT SHIELD FOR A GAS TURBINE ENGINE

(71) Applicant: Pratt & Whitney Canada Corp., Longueuil (CA)

(72) Inventors: Michael Papple, Verdun (CA); Robert Sze, Mississauga (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 423 days.

(21) Appl. No.: 14/294,473

(22) Filed: Jun. 3, 2014

(65) Prior Publication Data
US 2015/0345789 A1    Dec. 3, 2015

(51) Int. Cl.
| F23R 3/00 | (2006.01) |
| F02C 7/18 | (2006.01) |
| F23R 3/02 | (2006.01) |
| F23R 3/10 | (2006.01) |

(52) U.S. Cl.
CPC ............... *F23R 3/002* (2013.01); *F02C 7/18* (2013.01); *F23R 3/02* (2013.01); *F23R 3/10* (2013.01); *F23R 2900/03043* (2013.01); *F23R 2900/03045* (2013.01)

(58) Field of Classification Search
CPC .......... F02C 7/18; F02C 7/24; F05D 2220/32; F05D 2240/35; F23R 3/00; F23R 3/002; F23R 3/00702; F23R 3/04; F23R 3/06; F23R 3/10; F23R 3/50; F23R 3/60; F23R 2900/03041; F23R 2900/03042; F23R 2900/03043; F23R 2900/03044; F23R 2900/03045

USPC ........................................... 60/752–760, 796
See application file for complete search history.

(56) References Cited

U.S. PATENT DOCUMENTS

| 5,956,955 | A  | * | 9/1999 | Schmid | F23R 3/10 60/748 |
| 6,434,926 | B1 | * | 8/2002 | Dean | F23R 3/002 60/752 |
| 6,751,961 | B2 | * | 6/2004 | Pacheco-Tougas | F23R 3/002 60/752 |
| 7,363,763 | B2 | * | 4/2008 | Coughlan, III | F23R 3/002 60/752 |
| 7,464,554 | B2 | * | 12/2008 | Cheung | F23R 3/00 60/754 |
| 7,631,503 | B2 | * | 12/2009 | Stastny | F23R 3/002 60/752 |
| 7,665,306 | B2 |   | 2/2010 | Bronson et al. | |
| 7,681,398 | B2 | * | 3/2010 | Patel | F23R 3/002 60/752 |
| 7,775,051 | B2 |   | 8/2010 | Hernandez et al. | |
| 7,827,800 | B2 | * | 11/2010 | Stastny | F23R 3/002 60/752 |
| 9,134,028 | B2 | * | 9/2015 | Stastny | F23R 3/04 |

(Continued)

*Primary Examiner* — Bryon Gehman
(74) *Attorney, Agent, or Firm* — Norton Rose Fulbright Canada LLP

(57) ABSTRACT

A heat shield for a combustor of a gas turbine engine has a heat shield adapted to be mounted to a combustor wall with a back face of the heat shield in spaced-apart facing relationship with an inner surface of the combustor wall to define an air gap. Rails extend from the back face of the heat shield across the air gap. Grooves are defined in at least one of the rails. The rail grooves are in fluid flow communication with the air gap when the heat shield is mounted to the combustor wall.

21 Claims, 7 Drawing Sheets

(56) References Cited

U.S. PATENT DOCUMENTS

| | | |
|---|---|---|
| 2012/0240583 A1 | 9/2012 | Penz et al. |
| 2013/0019603 A1* | 1/2013 | Dierberger .............. F23R 3/002 60/772 |
| 2013/0199194 A1 | 8/2013 | Carlisle |

* cited by examiner

COMBUSTOR HEAT SHIELD FOR A GAS TURBINE ENGINE

TECHNICAL FIELD

The invention relates generally to gas turbine engine combustors and, more particularly, to combustor heat shields.

BACKGROUND OF THE ART

Heat shields such as those used to protect the combustor shells, are exposed to hot gases in the primary combustion zone. The amount of coolant available for cooling the heat shields must be minimized to improve the combustion efficiency and to reduce the smoke, unburned hydrocarbon and CO/NOx emission.

There is a continuing need for improved heat shields and targeted cooling schemes.

SUMMARY

In one aspect, there is provided a heat shield for a combustor of a gas turbine engine, comprising a heat shield adapted to be mounted to a combustor wall with a back face of the heat shield in spaced-apart facing relationship with an inner surface of the combustor wall to define an air gap between the heat shield and the combustor wall, rails extending from the back face of the heat shield across said air gap, and grooves defined in at least one of said rails, the grooves being in fluid flow communication with the air gap when the heat shield is mounted to the combustor wall.

In a second aspect, there is provided a method of cooling a combustor heat shield mounted in a combustor of a gas turbine engine, the method comprising: recuperating air leaking between a floating collar and a combustor dome portion, and directing the leakage air in a confined passage defined by a set of rails projecting from a back face of the combustor heat shield.

In a third aspect, there is provided a heat shield for a combustor of a gas turbine engine, comprising a heat shield body adapted to be mounted to a combustor wall with a back face of the heat shield body in spaced-apart facing relationship with an inner surface of the combustor wall to define an air gap between the heat shield body and the combustor wall, at least first and second fuel nozzle openings defined in said heat shield body, rails extending from the back face of the heat shield body across said air gap, the rails including radially inner and radially outer rails extending between opposed side edges of the heat shield body, and a pair of mid rails extending radially from the inner rail to the outer rail between the first and second fuel nozzle openings, the mid rails and the inner and outer rails defining a mid-region passage, said mid-region passage having coolant air outlet openings defined in the inner and outer rails.

DESCRIPTION OF THE DRAWINGS

Reference is now made to the accompanying figures, in which.

DETAILED DESCRIPTION

Figure 1:
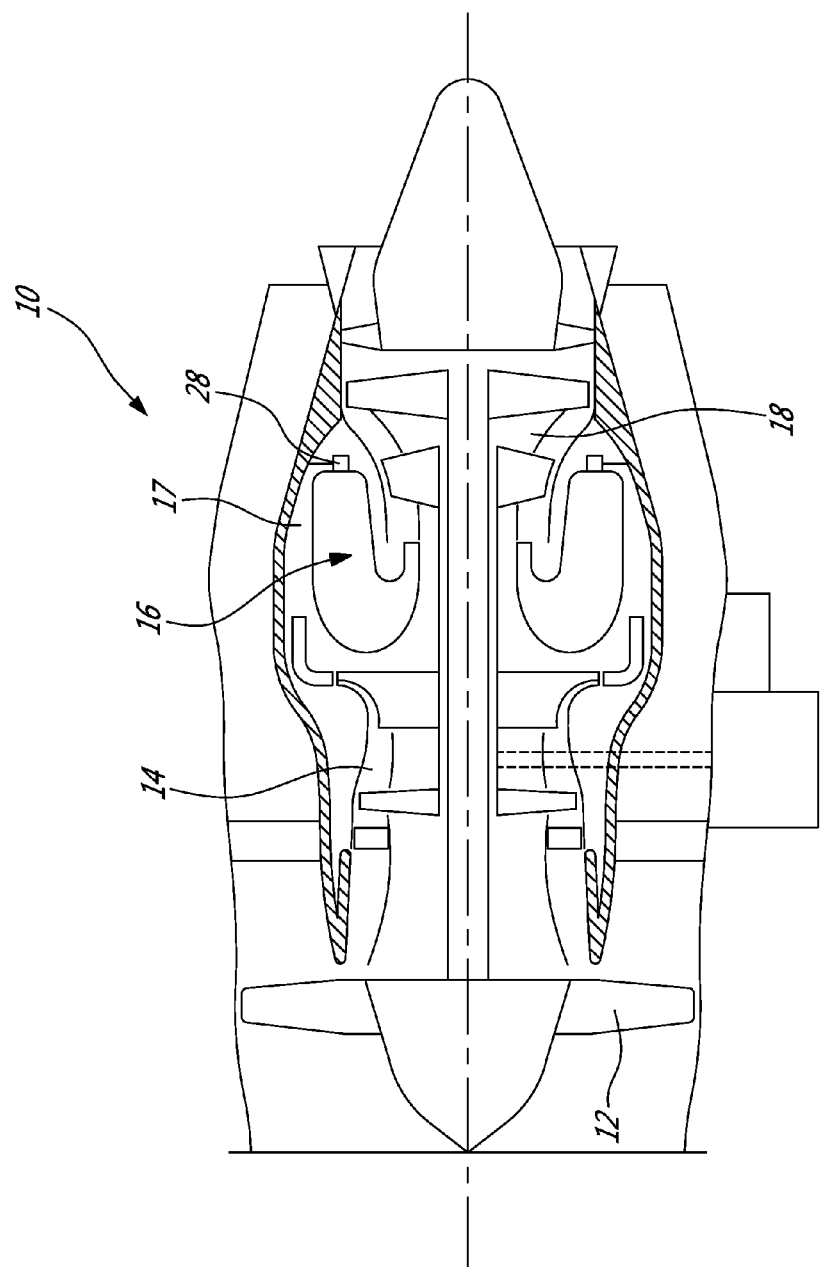
FIG. 1 is a schematic cross-section view of a turbofan engine having a reverse flow annular combustor and dome heat shields.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
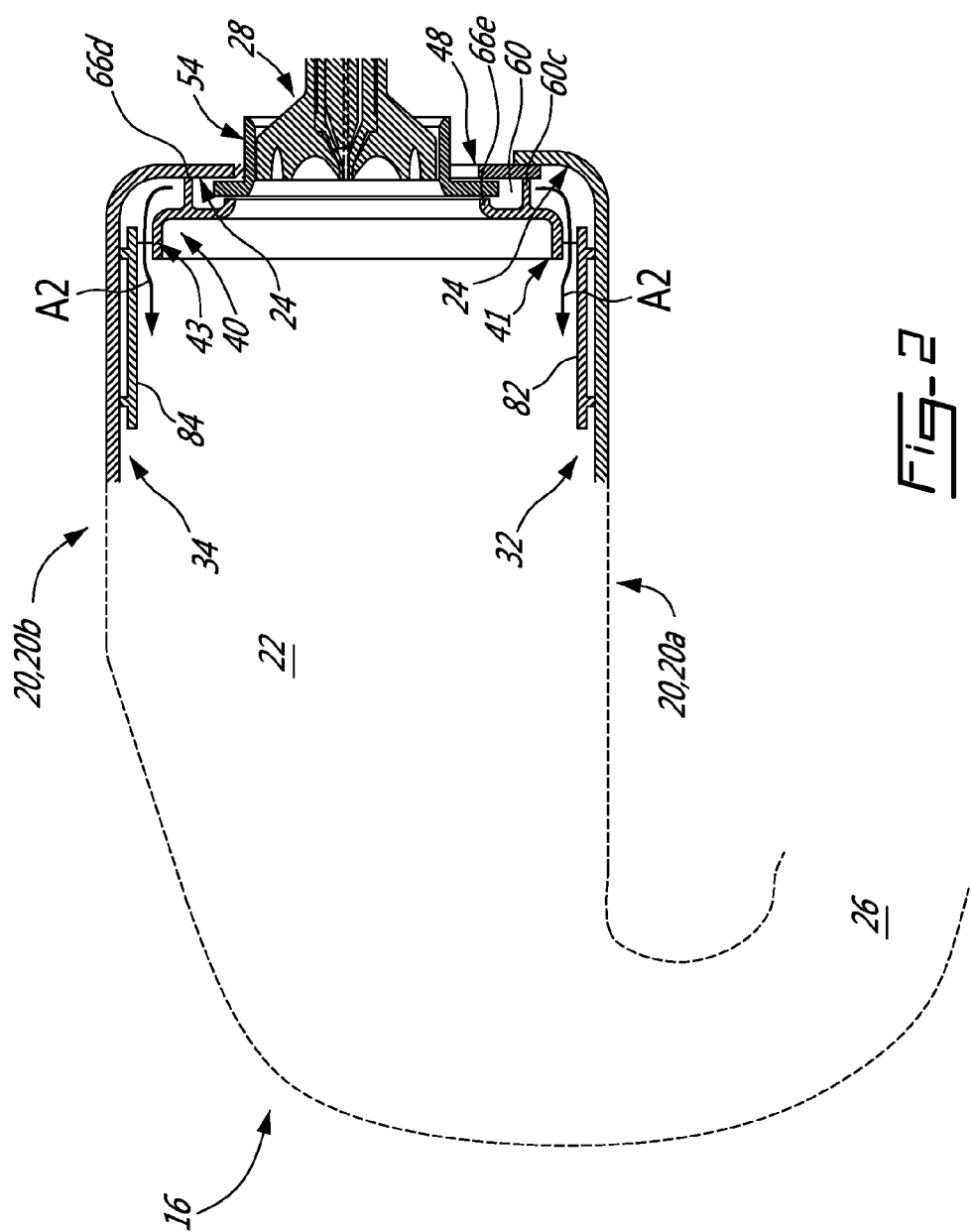
FIG. 2 is a schematic view of the combustor of the engine shown in FIG. 1.

The combustor 16 is housed in a plenum 17 supplied with compressed air from compressor 14. As shown in FIG. 2, the combustor 16 may comprise a reverse flow annular combustor shell 20 including a radially inner shell 20a and a radially outer shell 20b, defining a combustion chamber 22. The combustor 16 has a bulkhead or inlet dome portion 24. The combustor 16 further has an exit portion 26 for communicating combustion gases with the turbine section 18. As shown in FIG. 1, a plurality of fuel nozzles 28 are mounted to extend through the dome portion 24 of the combustor 20 to deliver a fuel-air mixture to the combustion chamber 22.

A plurality of impingement holes (not shown) are defined in the inner and outer shells 20a and 20b for cooling purposes, and dilution holes (not shown) may also be provided for combustion purposes. Inner and outer shells 20a and 20b may have any suitable configuration and, thus, are shown in dotted line only in FIG. 2. The inner and outer shells 20a and 20b are typically made out of sheet metal, though any suitable material(s) and manufacturing method(s) may be used. A thermal barrier coating (not shown) may be applied to the inner or combustion facing surfaces 32, 34 of the inner and outer front heat shields 82 and 84 to protect them against the high temperatures prevailing in the combustion chamber 22.

Figure 3:
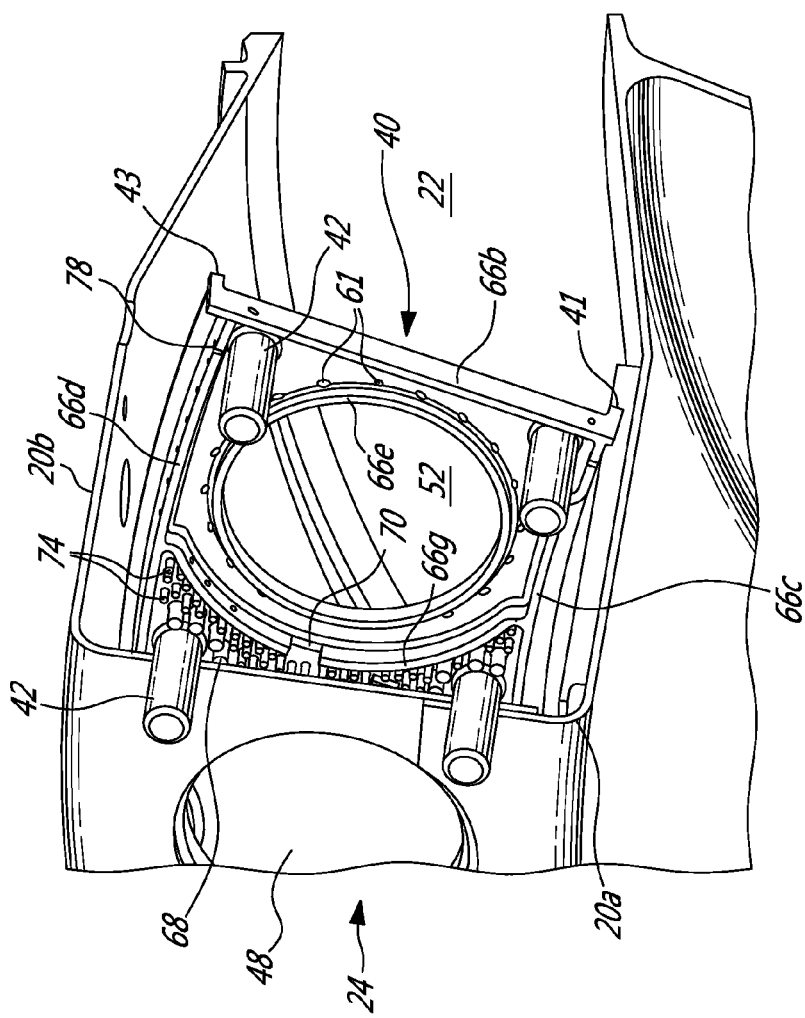
FIG. 3 is an enlarged rear isometric view of a dome portion of the combustor shown in FIG. 2 and illustrating the assembly of a dome heat shield with the radially inner and outer shells of the combustor shell, a portion of the inner and outer shells being removed to show a back face of the dome heat shield.

Referring concurrently to FIGS. 2 and 3, it can be appreciated that circumferentially distributed dome heat shields 40 (only one shown in FIGS. 2 and 3) are mounted to the dome portion 24 of the inner and outer shells 20a, 20b inside the combustion chamber 22 to protect the dome portion 24 from the high temperatures in the combustion chamber 22. The dome heat shields 40 are typically castings made out of high temperature capable materials. Each dome heat shield 40 has a plurality of threaded studs 42 (six according to the example shown in FIGS. 3-6) extending from a back face of the heat shield and through corresponding mounting holes (not shown) defined in the combustor dome. Self-locking nuts (not shown) are threadably engaged on the studs 42 from outside of the combustion chamber 22 for holding the dome heat shields 40 tightly against the combustor dome.

As shown in FIGS. 2-3, circumferentially spaced-apart fuel nozzle openings 48 are defined through the combustor dome portion 24 for allowing mounting of the fuel nozzles 28 to the combustor 16. At least one corresponding fuel nozzle opening 52 (two in the example illustrated in FIGS. 3-6) is defined in each of the dome heat shields 40 and is aligned with a corresponding fuel nozzle opening 48 in the combustor dome portion 24 for accommodating an associated fuel nozzle therein. The provision of two or more fuel nozzle openings 52 in each heat shield 40 reduces the number of heat shields required to cover the dome portion 24, the number of studs 42, rail, air coolant leakage, cost and weight when compared to dome heat shields for a single fuel nozzle. As illustrated in FIG. 2, a floating collar 54 is mounted in each nozzle opening 48 to provide sealing between the combustor shell 20 and the fuel nozzles 28 while allowing relative movement therebetween. The fuel nozzles 28 are slidably received in the floating collars 54. The floating collars 54 are axially trapped between the dome heat shields 40 and the dome portion 24 of the inner and outer combustor shells 20a, 20b. The fuel nozzle openings 48 are slightly oversized relative to the floating collars 54, thereby allowing limited radial movement of the collars 54 with the fuel nozzles 28 relative to the combustor shell 20.

As shown in FIG. 2, the dome heat shields 40 are spaced from the dome portion 24 so as to define a heat shield back face cooling air space or air gap 60. Relatively cool air from plenum 17 is admitted in the air gap 60. Impingement hole patterns are arranged in the dome portion 24 of the combustor shell 20 to optimize the heat shield cooling. As will be seen hereinafter, heat exchange promoting structures and rails may be strategically positioned on the back face of the heat shields 40 to locally promote enhance cooling in targeted or most thermally solicited areas of the heat shields.

Now referring concurrently to FIGS. 3 to 6, it can be seen that each individual heat shield 40 is provided in the form of a circular sector having radially inner and outer lips 41, 43 projecting forwardly from the front face of the heat shield between lateral edges 45, 47. Rails integrally extend from the back face of the heat shields 40 to strengthen the heat shields and direct the flow of cooling air as desired. Some of the rails may extend from the heat shield back face all the way into sealing contact with the inner surface of the combustor dome portion 24 and, thus, more or less act as sealing rails to compartmentalize the air gap 60, thereby directing the cooling air to targeted regions of the dome heat shields.

Figure 4:
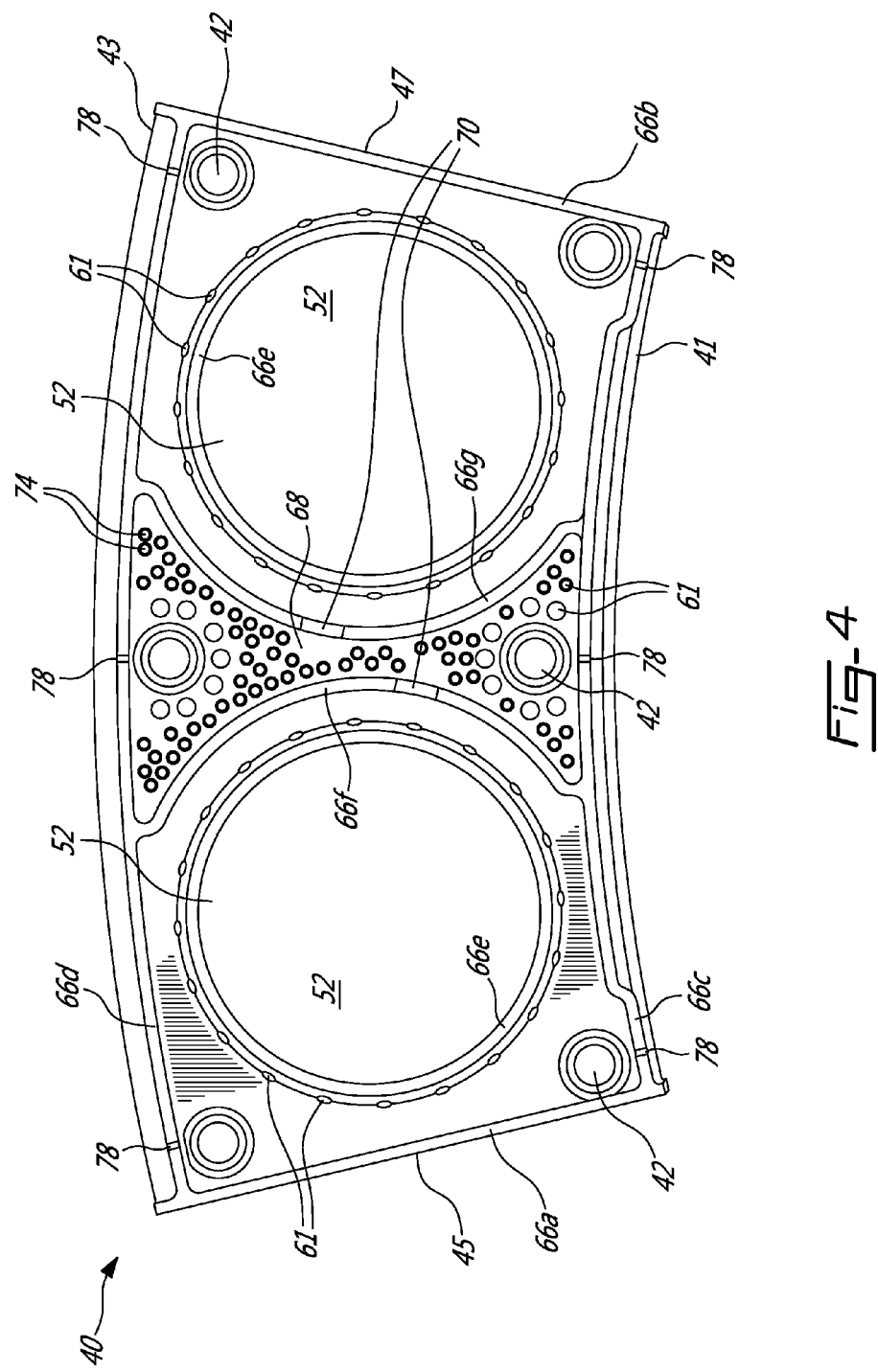
FIG. 4 is a rear view of the combustor dome heat shield shown in FIG. 3.

For instance, the rails may include lateral rails 66a, 66b extending along lateral edges 45, 47 between radially inner and outer rails 66c, 66d. These peripheral rails 66a, 66b, 66c, 66d form a closed perimeter at the back of the heat shield 40. The peripheral rails 66a, 66b, 66c, 66d extend across the air gap 60 into sealing contact with the inner surface of the dome portion 24 of the combustor 16. As can be appreciated from FIGS. 3 to 6, the inner and outer rails 66c, 66d may generally follow the inner and outer curvature of the heat shield 40. Referring more particularly to FIG. 4, it can be seen that the radially inner rail 66c may have slightly offset or curved end portions to provide sufficient room to accommodate the radially inner corner studs 42.

The rails may also include a circular rail or ring 66e about each fuel nozzle opening 52. As can be appreciated from FIG. 2, the height of the rings 66e is less than the height of the peripheral rails 66a, 66b, 66c, 66d. The rings 66e do not extend completely across the gap 60. The rings 66e are spaced from the inner surface of the combustor dome portion 24. A circular row of effusion holes 61 may be provided at the base of each ring 66e concentrically about each fuel nozzle opening 52 for allowing leakage air flowing through a gap between the floating collars 54 and the dome portion 24 to flow thought the dome heat shield 40 to provide for the formation of a cooling film over the front face of the dome heat shield 40. Such use of otherwise wasted leakage air advantageously contributes to minimize the amount of cooling air required for the heat shields 40.

Figure 5:
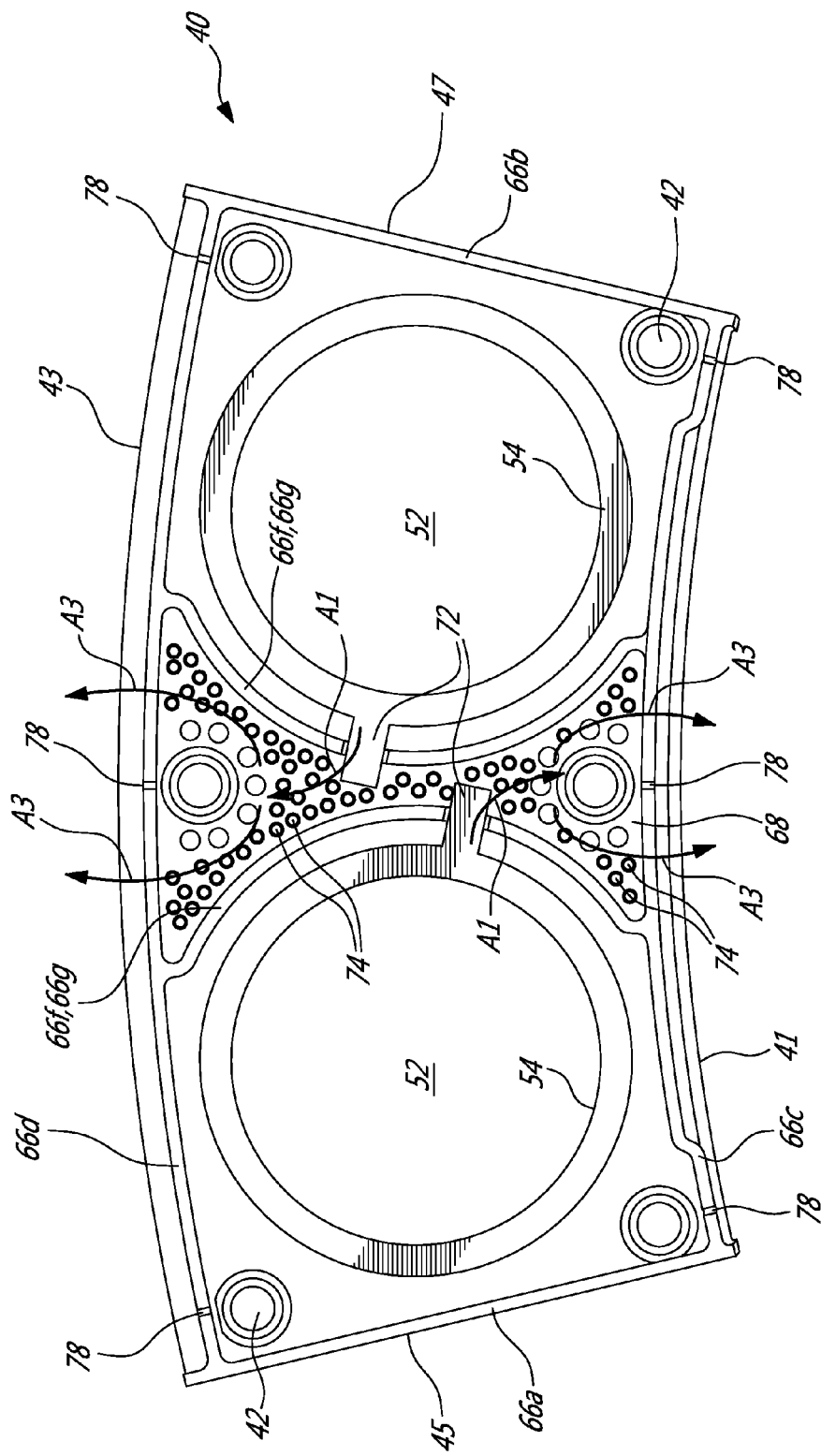
FIG. 5 is a rear view of the combustor dome heat shield illustrating the engagement of anti-rotation tabs of the fuel nozzle floating collars in corresponding slots defined in mid-rails projecting from the back surface of the combustor heat shield segment.
Figure 6:
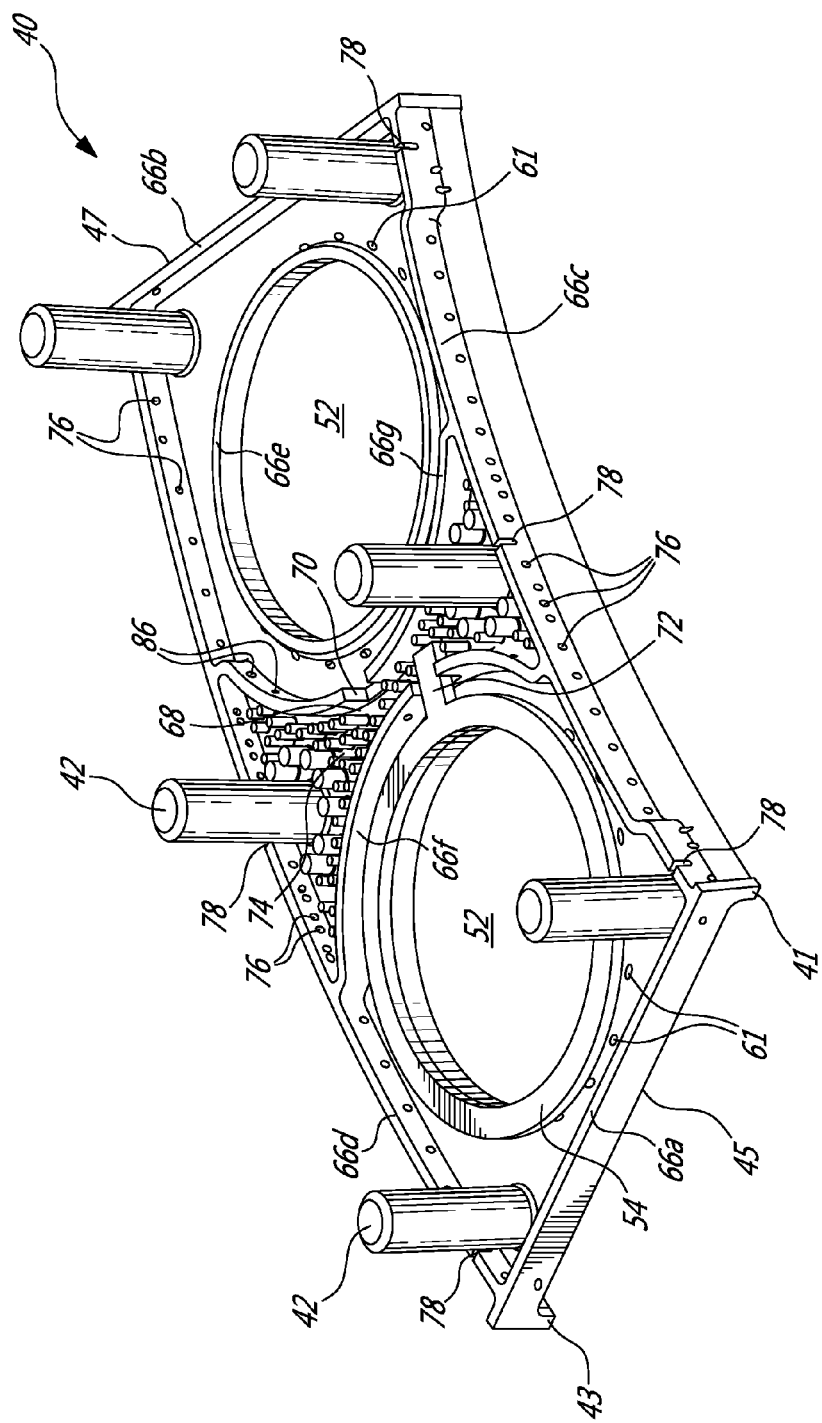
FIG. 6 is a rear isometric view of the combustor heat shield illustrating mid-region pin fins extending from the back face of the heat shield between the mid-rails, some effusion holes and heat transfer augmentation features being omitted for clarity.
Figure 7:
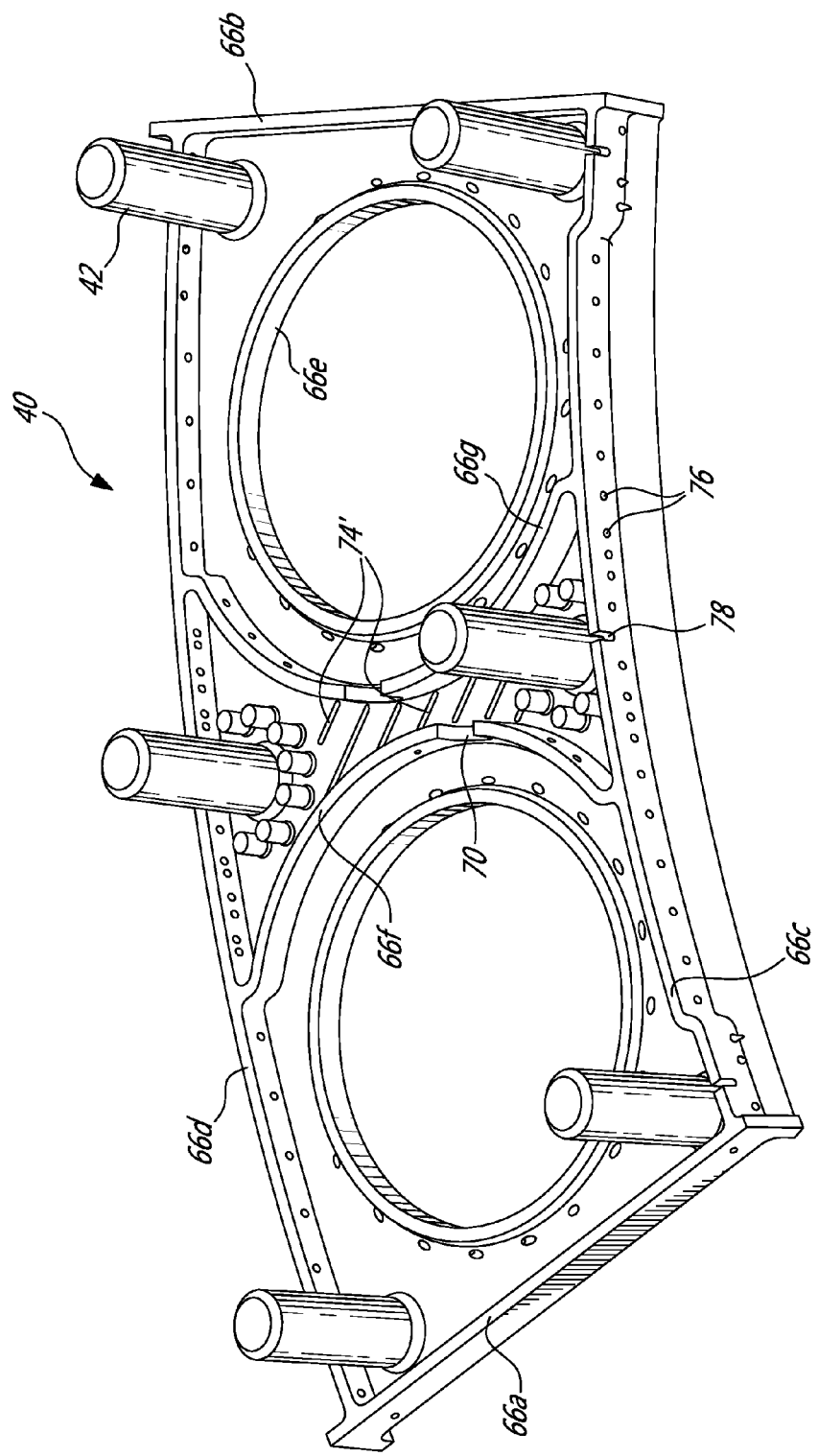
FIG. 7 is a rear isometric view of the combustor heat shield illustrating mid-region trip-strips extending from the back face of the heat shield between the mid-rails, some effusion holes and heat transfer augmentation features being omitted for clarity.

As shown in FIGS. 4 to 6, the rails may further include a pair of mid rails 66f, 66g extending from the inner rail 66c to the outer rail 66d between the fuel nozzle openings 52. The mid rails 66f, 66g may have the same height as the peripheral rails 66a, 66b, 66c, 66d for sealing engagement with the inner surface of the combustor dome portion 24. The mid rails 66f, 66g cooperate with the inner and outer rails 66c, 66d to define a sealed pocket or mid-region passage 68 in the air gap 60 between the dome heat shield 40 and the dome portion 24 of the combustor 16. As will be seen hereinafter, air coolant inlets and outlets are provided in the mid rails 66f, 66g and in the inner and outer rails 66c, 66d to modulate the flow of coolant air through the mid-region passage 68 and, thus, promote enhance cooling of the mid-region area of the heat shield 40 between the fuel nozzle openings 52. The provision of an enclosed air passage in the middle of the heat shield 40 allows directing the coolant flow on the back of the heat shield according to a predetermined path to promote better cooling of the mid-region of the heat shield. Such a mid-region cooling scheme may contribute to increase the durability of the heat shields 40.

The mid-rails are curved to geometrically conform to the bosses 66e around the fuel nozzles 28. As can be appreciated from FIGS. 4 and 5, each mid rail 66f, 66g may extend along an arc of circle having a center, which is coincident with the center of the adjacent fuel nozzle opening 52. This confers to the mid-region passage 68 an hourglass-like shape including a radially outwardly flaring section and a radially inwardly flaring section with a central constricted area therebetween.

A slot 70 is defined in each mid rail 66f, 66g for receiving an anti-rotation tab 72 of the floating collar 54 mounted in the associated fuel nozzle opening 52. Each anti-rotation slot represents a leakage site. Typically, the air leaking through the gap between an anti-rotation slot and associated anti-rotation tab of a floating collar is simply wasted. According to the illustrated embodiment, this leakage air is advantageously captured in the mid-region passage 68 formed between the mid-rails 66f, 66g and the inner and outer rails 66c, 66d and is used to cool the heat shield mid-region, the inner and outer lips 41, 43 of the heat shield 40 and to form a starter film on the inner and outer front heat shields 82, 84 (FIG. 2) mounted inside the combustor 16 adjacent to the dome heat shields 40, as will be seen herein after. As depicted by arrows A1 in FIG. 5, one slot 70 feed the radially outer flaring section of the mid-region passage 68 while the other slot feed radially inwardly flaring section of the passage 68. By having the anti-rotation slots 70 opening into a confined space defined by the mid-rails 66f, 66g and the inner and outer rails 66c, 66d, it is possible to take advantage of the leakage that occurs at the interface of the floating collars 54 and the nozzle openings 48 to save on cooling air.

In a preferred implementation, the slots 70 are offset from one another. A first one of the slots 70 is oriented to deliver air in the radially outwardly flaring section of the mid-region passage 68, whereas the second one is oriented to direct air in the radially inwardly flaring section of the mid-region passage 68. This provides for opposite air coolant feeds in the radially outward and radially inward sections of the mid-region passage 68.

As shown in FIGS. 3 to 7, heat transfer augmentation features or flow turbulators, such as full or partial height pin fins 74 or trip-strips 74' (FIG. 7) are provided in the mid-region passage 68 to increase cooling effectiveness. In the illustrated embodiment, different sizes of pin fins 74 extend integrally from the back face of the dome heat shield 40 between the mid rails 66f, 66g. The pin fins 74 may have different cross-sections and/or different heights. For instance, the pin fins can be cylindrical, elliptical or square. As shown in FIG. 4, the pin fins 74 in front or immediately upstream of the studs 42 may be of full height and have a greater cross-section than the other pins 74 in order to react the tightening force of the bolts (not shown) on the studs 42.

The turbulent promoters can also be dimples, i.e. local indentations on the heat shield casting, similar to the surface of a golf ball. The advantage of these dimples is that they would not interfere with the lasering of the effusion holes.

As best shown in FIG. 6, outlet openings, such as rail holes 76 and rail grooves 78 are distributed along the inner and outer rails 66c, 66d. The holes 76 and the grooves 78 in the inner and outer rails 66c, 66d allow to control the heat shield cavity pressure, including the coolant air pressure in the mid-region passage 68, and to direct the spent flow for optimizing the cooling scheme effectiveness. According to the illustrated embodiment, the density of rail holes 76 at opposed ends of the mid-region passage 68 is greater than along the other sections of the radially inner and outer rails 66c, 66d. In the illustrated embodiment, the rail grooves 78 are positioned in the inner and outer rails 66c, 66d behind or immediately downstream of the studs 42. However, it is understood that the rail grooves 78 could be provided anywhere along any one of the rails 66a, 66b, 66c, 66d, 66e, 66f, 66g to allow the passage of coolant air from one side of a particular rail to an opposite side thereof. It is also understood that rail grooves could be used in place of rail holes and not just in combination therewith. Rail holes are typically laser drilled with all the other types of holes (e.g. effusion holes) that need to be defined through the heat shield 40. Laser drilling requires a line of sight. When there is an obstacle, such as a stud or a pin, it might not be possible or practical to laser drill a hole. For instance, laser drilling a hole in a rail in front of a stud may be problematic in that the laser may strike and damage the stud. The pin fins may also be damaged while laser drilling through the heat shield. In contrast, the rail grooves may be obtained via electrical discharge machining (EDM). EDM does not require a line of sight. Accordingly, rail grooves may be defined in the rails in front of the studs without risking damaging the studs or the pin fins. Rail grooves are advantageous from a manufacturing point of view in that they are easier to make than laser drilled holes. With EDM grooves it is possible to have tighter tolerance control than with laser drilled holes. They are more precise and cheaper to make. The rail grooves provides for a better distribution of the flow. Therefore, while the illustrated embodiment only includes rails grooves behind the studs, it is herein contemplated to replace all the holes in the rails with grooves.

In addition to the outlet openings (rail holes 76 and rail grooves 78) defined in the inner and outer rails 66c, 66d, mid-rail holes 86 may be defined in the mid rails 66f, 66g for discharging a portion of the coolant air flowing through the mid-region passage 68. The mid-rail holes 86 may be concentrated at the radially inner and radially outer ends of the mid-region passage 68. A portion of the coolant air in the mid-region passage 68 may also exit the mid-region through effusion holes (not shown) extending through the thickness of the dome heat shield 40.

As shown by arrows A2 in FIG. 2, the coolant air discharged from the rail holes 76 and rail grooves 78 flows over the inner and outer lips 41, 43. The coolant air is guided by the lips 41, 43 to flow parallel to inner and outer front heat shields 82, 84 respectively mounted to the inner and outer shells 20a, 20b adjacent to the dome heat shields 40. The lips 41, 43 may have fins (not shown) to help cool the lips and guide the coolant. The spent coolant served as a starter film to cool the inner and outer front heat shields 82, 84. The spent coolant also wash the hot faces of the front heat shields 82, 84 to prevent unburnt fuel to form soot deposition on the heat shield hot faces during engine starts or low power conditions. Soot is undesirable in that it reacts chemically with the heat shield coating, causing it to spall, thereby exposing the base metal of the heat shields to the hot gases. The black surface (i.e. soot deposition on the heat shield) would also absorb heat more readily rendering the heat shields hotter, thereby reducing the life of the heat shields.

In operation, coolant air from the plenum 17 leaks through the gap between each floating collar 54 and the combustor dome portion 24. This leakage air is recuperated and guided to cool the combustor heat shield 40. At each floating collar leakage site, a portion of the leakage air passes through the effusion holes 61 near the fuel nozzle openings 52 to provide for the formation of a film of coolant air over the front face of the heat shield 40. Another portion of the air leaks through the gap between the floating collar anti-rotation tab 72 and the associated slot 70, and enters the mid-region passage 68. As depicted by arrows A1 in FIG. 5, this provides for a first feed of air in the radially outwardly flaring section of the mid-region passage and a second feed of air in the radially inwardly flaring section of the mid-region passage 68. As shown by arrows A3 in FIG. 5, these two separate and opposite flows of air passes over and around the heat transfer augmentation features 74 provided in the mid-region passage 68. A main portion of the air is then discharged from the mid-region passage 68 through the rail holes 76 and rail grooves 78 defined in the inner and outer rails 66c, 66d. The remainder of the air in the mid-region passage 68 is discharged through effusion holes (not shown) defined in the heat shield 40 and/or through the mid rail holes 86. The air discharged through the rail holes 76 and rail grooves 78 flows over the inner and outer lips 41, 43, thereby cooling the lips 41, 43. As shown in FIG. 2, the lips 41, 43 guide the air parallel to the inner and outer front heat shields 82, 84 to contribute to the formation of starter films for the inner and outer front heat shields 82, 84.

The above description is meant to be exemplary only, and one skilled in the art will recognize that changes may be made to the embodiments described without departing from the scope of the invention disclosed. For example, the invention can be provided in any suitable heat shield configuration and in any suitable combustor configuration, and is not limited to application in turbofan engines. It is understood that the principles of the inventions are not limited to combustor dome heat shields. For instance, the rail grooves could be applied to other types of the combustor heat shields. Still other modifications which fall within the scope of the present invention will be apparent to those

What is claim is:

1. A heat shield for a combustor of a gas turbine engine, comprising a heat shield body adapted to be mounted to a combustor wall with a back face of the heat shield body in spaced-apart facing relationship with an inner surface of the combustor wall to define an air gap between the heat shield body and the combustor wall, rails extending from the back face of the heat shield body, and grooves defined in at least one of said rails, the grooves being in fluid flow communication with the air gap when the heat shield body is mounted to the combustor wall, wherein the rails include radially inner and radially outer rails extending between opposed side edges of the heat shield body and wherein at least two fuel nozzle openings are defined in the heat shield body between the inner and outer rails, wherein the rails further comprise a pair of mid rails projecting from the back face of the heat shield body, the mid rails extending radially between the radially inner and the radially outer rails and disposed between the at least two fuel nozzle openings, the mid rails and the inner and outer rails defining a mid-region passage, said mid-region passage having coolant air outlet openings defined in the inner and outer rails.

2. The heat shield defined in claim 1, wherein at least one of the grooves is defined in each of said inner and outer rails.

3. The heat shield defined in claim 2, wherein the grooves include first and second arrays of grooves distributed along the inner and outer rails.

4. The heat shield defined in claim 1, wherein at least some of the grooves are positioned behind studs extending from the back face of the heat shield body.

5. The heat shield defined in claim 1, wherein said at least one of said grooves is part of said coolant air outlet openings of the mid-region passage.

6. The heat shield defined in claim 5, wherein the coolant air outlet openings further comprises holes defined in the inner and outer rails.

7. The heat shield defined in claim 6, wherein the coolant air outlet openings of the mid-region passage further comprises openings defined in the mid rails.

8. The heat shield defined in claim 1, wherein the mid-region passage has heat transfer augmentation features.

9. The heat shield defined in claim 8, wherein the heat transfer augmentation features comprise different sizes of pin fins extending from the back face of the heat shield body.

10. The heat shield defined in claim 9, wherein studs extend from the back face of the heat shield body, at least one of said studs being disposed in said mid-region passage, and wherein the pin fins disposed immediately in front of said at least one stud have a greater cross-section than the other pin fins provided in the mid-region passage.

11. The heat shield defined in claim 8, wherein the heat transfer augmentation features comprise trip strips.

12. The heat shield defined in claim 8, wherein the heat transfer augmentation features comprise dimples.

13. The heat shield defined in claim 1, wherein said coolant air outlet openings are configured to discharge coolant air from the mid-region passage onto inner and outer lips projecting forwardly from a front face of the heat shield body.

14. The heat shield defined in claim 1, wherein the mid-region passage has at least first and second air coolant inlets defined in respective ones of the mid rails.

15. The heat shield defined in claim 14, wherein each of the at least first and second air coolant inlets includes a slot defined in a respective one of the mid-rails for receiving an anti-rotation tab of a floating collar.

16. The heat shield defined in claim 14, wherein the first and second air coolant inlets respectively have a radially inner component and a radially outer component to provide for two radially opposite air coolant flows in the mid-region passage.

17. The heat shield defined in claim 1, wherein the mid-region passage has an hourglass-like shape including a radially outwardly flaring section, a radially inwardly flaring section, and a central constricted section, the radially outwardly flaring section and the radially inwardly flaring section being individually feed via respective air coolant inlets defined in the mid-rails.

18. The heat shield defined in claim 1, wherein each mid-rail extends along an arc of circle having a center coincident with a center of an adjacent one of the at least two fuel nozzle openings.

19. A method of cooling a combustor heat shield mounted in a combustor of a gas turbine engine, the method comprising: recuperating air leaking between a floating collar and a combustor dome portion, and directing the leakage air in a confined passage defined by a set of rails projecting from a back face of the combustor heat shield, wherein the set of rails comprises first and second mid rails extending between radially inner and radially outer rails, and wherein directing the leakage air in the confined passage comprises allowing the recuperated leakage air to leak through first and second anti-rotation slots respectively defined in said first and second mid rails for receiving corresponding anti-rotation tabs of associated floating collars.

20. A heat shield for a combustor of a gas turbine engine, comprising a heat shield body adapted to be mounted to a combustor wall with a back face of the heat shield body in spaced-apart facing relationship with an inner surface of the combustor wall to define an air gap between the heat shield body and the combustor wall, at least first and second fuel nozzle openings defined in said heat shield body, rails extending from the back face of the heat shield body across said air gap, the rails including radially inner and radially outer rails extending between opposed side edges of the heat shield body, and a pair of mid rails extending radially from the inner rail to the outer rail between the first and second fuel nozzle openings, the mid rails and the inner and outer rails defining a mid-region passage, said mid-region passage having coolant air outlet openings defined in the inner and outer rails.

21. The heat shield defined in claim 20, wherein said mid-region passage has coolant air inlet openings defined in said mid rails.

* * * * *